(12) United States Patent
Nelson et al.

(10) Patent No.: US 7,262,571 B2
(45) Date of Patent: Aug. 28, 2007

(54) RESISTIVE BRAKING MODULE WITH THERMAL PROTECTION

(75) Inventors: Michael John Nelson, Prior Lake, MN (US); Nathaniel D. Herman, Chanhassen, MN (US); Edward Joseph Arguello, Jr., Prior Lake, MN (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 534 days.

(21) Appl. No.: 10/935,012

(22) Filed: Sep. 7, 2004

(65) Prior Publication Data

US 2006/0050462 A1    Mar. 9, 2006

(51) Int. Cl.
*H02P 3/22* (2006.01)
(52) U.S. Cl. .................... 318/380; 318/471
(58) Field of Classification Search ........ 318/375–380, 318/471–473; 388/903, 934
See application file for complete search history.

(56) References Cited

U.S. PATENT DOCUMENTS

| | | | | |
|---|---|---|---|---|
| 4,035,692 A | * | 7/1977 | Luy et al. | 361/103 |
| 4,039,914 A | * | 8/1977 | Steigerwald et al. | 318/375 |
| 4,093,900 A | * | 6/1978 | Plunkett | 318/370 |
| 4,453,114 A | * | 6/1984 | Nordlund | 318/376 |
| 5,196,656 A | * | 3/1993 | Mizuno et al. | 187/314 |
| 5,276,292 A | * | 1/1994 | Goto et al. | 187/288 |
| 5,424,622 A | * | 6/1995 | Keller et al. | 318/375 |
| 5,814,954 A | * | 9/1998 | Suzuki et al. | 318/376 |
| 7,012,392 B2 | * | 3/2006 | Nguyen et al. | 318/376 |

OTHER PUBLICATIONS

Bonitron, Model M3500DB, Dynamic Braking Modules for Allen-Bradley 1394(Series C) Digital Motion Control System, User's Manual and Product Specifications, no date.

* cited by examiner

*Primary Examiner*—Bentsu Ro
(74) *Attorney, Agent, or Firm*—Quarles & Brady LLP; Alexander R. Kuszewski

(57) ABSTRACT

A braking module includes a braking load, an input terminal, an output terminal, and control logic. The input terminal is adapted to receive a motor drive signal. The control logic is adapted to receive a motor enable signal, couple the output terminal to the input terminal responsive to the motor enable signal being asserted, couple the output terminal to the braking load responsive to the motor enable signal being deasserted, and prevent the coupling of the output terminal to the input terminal responsive to a temperature of the braking module exceeding a predetermined disable set point. A method for controlling a motor includes coupling a drive lead carrying a motor drive signal to a motor lead of the motor responsive to a motor enable signal being asserted. The motor lead is coupled to a braking load responsive to the motor enable signal being deasserted. The coupling of the drive lead to the motor lead is prevented responsive to a temperature of the braking load exceeding a predetermined disable set point.

30 Claims, 3 Drawing Sheets

RESISTIVE BRAKING MODULE WITH THERMAL PROTECTION

CROSS-REFERENCE TO RELATED APPLICATIONS

Not applicable.

STATEMENT REGARDING FEDERALLY SPONSORED RESEARCH OR DEVELOPMENT

Not applicable

BACKGROUND OF THE INVENTION

The present invention relates to controlled resistive braking of non-regenerative AC drives and more particularly to a resistive braking module with thermal protection.

Power plants are linked to power consuming facilities (e.g., buildings, factories, etc.) via utility grids designed so as to be extremely efficient in delivering massive amounts of power. To facilitate efficient distribution, power is delivered over long distances as low frequency three-phase AC current. Despite being distributable efficiently, low frequency AC current is not suitable for end use in consuming facilities. Thus, prior to end use, power delivered by a utility is converted to a useable form. To this end, a typical power "conditioning" configuration includes an AC-to-DC rectifier that converts the utility AC power to DC across positive and negative DC buses (i.e., across a DC link) and an inverter linked to the DC link that converts the DC power back to three phase AC power having an end-useable form (e.g., three phase, relatively high frequency AC voltage). A controller controls the inverter in a manner calculated to provide voltage waveforms required by the consuming facility.

Motors and linked loads are one type of common inductive load employed at many consuming facilities and, while the present invention is applicable to several different load types, in order to simplify this explanation an exemplary motor and load will be assumed. To drive a motor an inverter includes a plurality of switches that can be controlled to link and delink the positive and negative DC buses to motor supply lines. The linking-delinking sequence causes voltage pulses on the motor supply lines that together define alternating voltage waveforms. When controlled correctly, the waveforms cooperate to generate a rotating magnetic field inside a motor stator core. In an induction motor, the magnetic field induces a field in motor rotor windings. The rotor field is attracted to the rotating stator field and thus the rotor rotates within the stator core. In a permanent magnet motor, one or more magnets on the rotor are attracted to the rotating magnetic field.

One technique for stopping a motor and linked load is to cut off power to the inverter such that the stator field is eliminated. Without power the stator and rotor fields diminish and eventually the rotor slows and stops. While this stopping solution is suitable for some applications, this solution is unacceptable in other applications where motors have to be stopped relatively quickly for safety or duty cycle concerns.

A technique for actively slowing the motor involves using a resistive brake circuit. The resistive brake includes braking resistors coupled across the phases of the motor and switches for enabling the braking resistors. When the switches are closed, and the motor is isolated from the drive unit (i.e., the drive signals are isolated), the motor effectively acts as a generator to provide current to the load created by the braking resistors. Hence, the energy stored in the rotor and stator fields and the inertial energy stored in the rotating motor/load are transferred to the braking resistors. The power transferred to the braking resistors is dissipated as heat.

Because, the energy stored in the motor is dissipated as heat, the brake unit may overheat in situations where the duty cycle between motoring and braking is short and the brake is exercised repeatedly. Typical resistive braking units employ wire-wound resistors and depend on overheating the resistor wire to the point of failure as a thermal overload protection. However, even before the point of failure, the heat may build up to a sufficient level that the temperature of the unit exceeds the Underwriters Laboratory (UL) requirements for safe touch. Moreover, the failure mechanism of the wire-wound resistors limits the range of applications in which they may be used in terms of motor size and duty cycle.

Another technique for braking a rotating motor involves controlling the inverter that supplies the drive signals to the motor such that the drive signals lag the motor fields (i.e., typically the drive signals lead the motor fields to drive the motor). The motor acts as a generator in this situation, and the power generated thereby can be dissipated by the inverter as heat or transferred back to the DC bus in a regenerative fashion. This technique requires more complex inverter circuitry and control logic, thereby increasing cost. Additionally, if a motor and drive unit configured to support a non-braking application is instead to be used to support an application that requires braking, the entire drive unit would have to be changed to facilitate the braking feature.

Therefore, there is a need for a resistive braking system that can stop a load (e.g., motor and connected load) within a given time period that requires a relatively small and inexpensive brake mechanism that can be installed with an exiting equipment base and that will maintain operating temperatures within desired operating limits.

This section of this document is intended to introduce various aspects of art that may be related to various aspects of the present invention described and/or claimed below. This section provides background information to facilitate a better understanding of the various aspects of the present invention. It should be understood that the statements in this section of this document are to be read in this light, and not as admissions of prior art. The present invention is directed to overcoming, or at least reducing the effects of, one or more of the problems set forth above.

BRIEF SUMMARY OF THE INVENTION

The present inventors have recognized that a resistive braking module may be constructed including thermal protection that reduces the likelihood that the temperatures of the braking module may exceed a desired limit due to intentional or unintentional frequent exercising of the braking module. The present inventors have also recognized that a resistive braking module may also be implemented that can be connected between a motor drive unit and a motor to provide braking capability for the motor without requiring modification to the motor or the drive unit.

One aspect of the present invention is seen in a braking module including a braking load, an input terminal, an output terminal, and control logic. The input terminal is adapted to receive a motor drive signal. The control logic is adapted to receive a motor enable signal, couple the output terminal to the input terminal responsive to the motor enable signal being asserted, couple the output terminal to the braking load responsive to the motor enable signal being deasserted, and prevent the coupling of the output terminal to the input terminal responsive to a temperature of the braking module exceeding a predetermined disable set point.

Another aspect of the present invention is seen in a braking module including a plurality of input terminals, a plurality of output terminals, a braking load coupled across the output terminals, and control logic. The input terminals are adapted to receive a motor drive signal including a plurality of phase components. The control logic is adapted to receive a motor enable signal, couple the output terminals to the input terminals responsive to the motor enable signal being asserted, couple the output terminals to the braking load responsive to the motor enable signal being deasserted, and prevent the coupling of the output terminals to the input terminals responsive to a temperature of the braking module exceeding a predetermined disable set point.

Still another aspect of the present invention is seen in a method for controlling a motor. The method includes coupling a drive lead carrying a motor drive signal to a motor lead of the motor responsive to a motor enable signal being asserted. The motor lead is coupled to a braking load responsive to the motor enable signal being deasserted. The coupling of the drive lead to the motor lead is prevented responsive to a temperature of the braking load exceeding a predetermined disable set point.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

BRIEF DESCRIPTION OF THE SEVERAL VIEWS OF THE DRAWINGS

The invention will hereafter be described with reference to the accompanying drawings, wherein like reference numerals denote like elements, and.

DETAILED DESCRIPTION OF THE INVENTION

One or more specific embodiments of the present invention will be described below. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
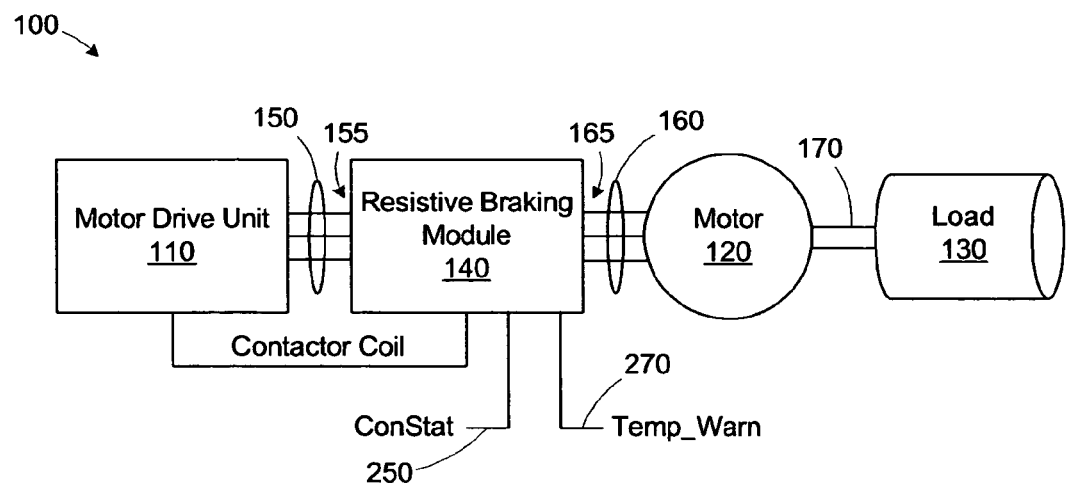
FIG. 1 is a schematic diagram of a motor control system in accordance with one embodiment of the present invention.

Referring now to the drawings wherein like reference numbers correspond to similar components throughout the several views and, specifically, referring to FIG. 1, the present invention shall be described in the context of an exemplary motor control system 100. The motor control system 100 includes a drive unit 110 and a motor 120 coupled to a load 130. A resistive braking module 140 is coupled between the drive unit 110 and the motor 120. The resistive braking module 140 receives drive leads 150 from the drive unit 110 at input terminals 155 and connects to motor leads 160 of the motor 120 at output terminals 165. In the illustrated embodiment, the motor 120 is a three-phase permanent magnet motor and the leads 150, 160 provide the three phase inputs (i.e., W, V, and U) for the motor 120. The drive unit 110 also provides a contactor coil signal for enabling the motor 120. Although not illustrated, as is well known in the motor controls art, cable shield clamps may be used in conjunction with the connections between the drive unit 110, the resistive braking module 140, and the motor 120. The application of the present invention is not limited to any particular type or size of motor.

Although the resistive braking module 140 is illustrated as being physically separate from the drive unit 110, the application of the invention is not so limited. In some embodiments, the resistive braking module 140 may be integrated into the drive unit 110. One advantage of a separate resistive braking module 140 is that it may be installed with an existing equipment base. As such, the motor 120 can be equipped with resistive braking capability without requiring a different drive unit 110.

In general, the drive unit 110 produces positive and negative voltage pulses in specific sequences to generate AC voltages having controllable amplitudes and frequencies on the drive leads 150. The construct and operation of drive units for performing this function are well known to those of ordinary skill in the art. An exemplary drive unit 110 capable of performing this function is a drive in the Kinetix 6000 drive family offered commercially by Rockwell Automation, Inc. of Milwaukee, Wis. The AC voltages provided by the drive unit 110, cause varying currents that induce a rotating magnetic field within a stator core (not illustrated) of the motor 120. A motor rotor (not illustrated) which is linked to a motor shaft 170 resides within the stator core. The rotor includes either permanent magnets (i.e., a permanent magnet motor) or windings (i.e., an induction motor) that interact with the magnetic field in the stator to cause the rotor to rotate within the stator core. The load 130 is attached via the shaft 170 to the rotor and therefore, when the rotor rotates, the load 130 also rotates in the same direction.

Figure 2:
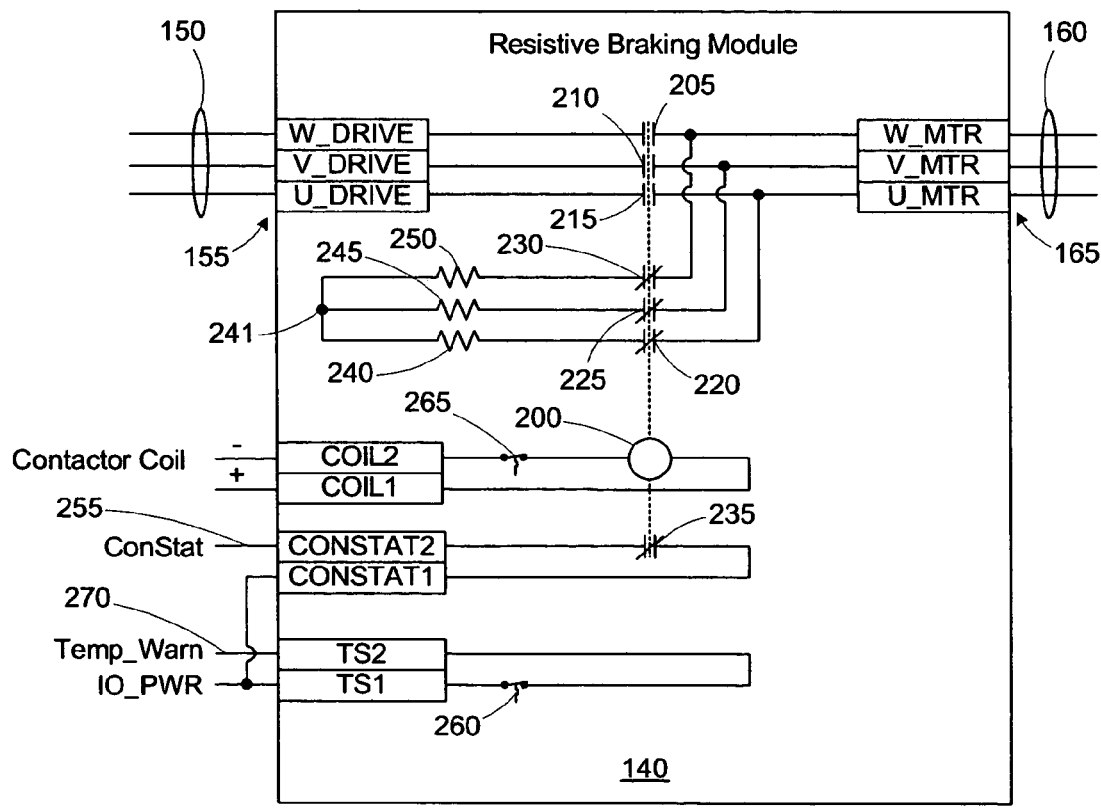
FIG. 2 is a schematic diagram of a resistive braking module in the motor control system of FIG. 1.

Turning now to FIG. 2, a schematic diagram of the resistive braking module 140 in the motor control system 100 of FIG. 1 is illustrated. The resistive braking module 140 receives a contactor coil signal from the drive unit 110 indicating the desired operating state (i.e., driven or decelerating) of the motor 120. When the contactor coil signal is asserted to activate the motor 120, the drive unit 110 provides drive voltages on the drive leads 150 for operating the motor. The resistive braking module 140 includes a contactor 200 that is activated by the contactor coil signal. The contactor 200 includes normally open load contacts 205, 210, 215 coupled in a "Y" configuration between the drive leads 150 and a common node 241. When the contactor coil signal is asserted, the load contacts 205, 210, 215 close, and the drive voltages are applied via the drive unit 110 to drive the motor 120. An exemplary contactor 200 suitable for use in the resistive braking module 110 is an Allen-Bradley 100S series contactor offered commercially by Rockwell Automation, Inc.

When the contactor coil signal is deasserted to deactivate the motor 120, the contactor 200 is deactivated, and the load contacts 205, 210, 215 return to their normally open state and cut off the drive voltages to the motor 120. However, when the motor 120 and load 130 are still rotating, the stored field energy and inertial energy must be dissipated to stop the motor 120.

The contactor 200 also includes normally closed auxiliary contacts 220, 225, 230, 235 mechanically linked to the load contacts 205, 210, 220 that close when the contactor coil signal is removed and the contactor 200 is deactivated. The auxiliary contacts 220, 225, 230 couple braking resistors 240, 245, 250 across the phases of the motor leads 160. The motor 120 acts as a generator in this state that drives the electrical load created by the braking resistors 240, 245, 250 to dissipate the energy stored in the motor/load combination. The energy of the motor/load is dissipated as heat in by the braking resistors 240, 245, 250.

In the illustrated embodiment, the braking resistors 240, 245, 250 are ceramic bar style resistors mounted on a fiberglass insulator. Of course, other types of resistors may be used depending on the particular implementation. The capacity and resistance values of the braking resistors 240, 245, 250 are implementation specific and depend on factors such as the RMS current and instantaneous peak current generated by the largest motor 120 intended to be used with the resistive braking module 140, the speed range and inertial mismatch, the intended duty cycle, etc.

The auxiliary contact 235 provides a contactor status signal (ConStat). The resistive braking module 140 receives an external IO_PWR signal, which is provided to the auxiliary contact 235. When the contactor 200 is open (i.e., the motor 120 is off), the auxiliary contact 235 is closed and the IO_PWR signal is passed to a contactor status output terminal 255. When the contactor 200 is closed (i.e., the motor 120 is operating), the auxiliary contact 235 is open. The IO_PWR signal is interrupted and no voltage appears at the contactor status output terminal 255. Hence, the ConStat signal is at a high logic state when the motor 120 is off and at a low logic state when the motor 120 is operating. The ConStat signal may be passed to a programmable logic controller (PLC) (not illustrated) or other control circuitry, depending on the particular implementation. The contactor status output terminal 255 may also be coupled to a local indication device, such as an LED to indicate the contactor status.

As the duty cycle of the resistive braking module 140 increases, the temperature of the braking resistors 240, 245, 250 rises as heat dissipated therein does not have time to transfer to the ambient environment. Accordingly, the temperature of the resistive braking module 140 itself rises, and, if unchecked, the temperature may rise above established Underwriters Laboratory (UL) safe touch standards. To reduce the likelihood of the resistive braking module 140 exceeding safe touch temperature limits, thermal protection is provided through normally closed thermal limit switches 260, 265.

The thermal limit switch 260 provides an elevated temperature warning (Temp_Warn) if the temperature exceeds a temperature warning set point of approximately 65 degrees Celsius. The external IO_PWR signal is also provided to the thermal limit switch 260. If the temperature is below its activation point, the thermal limit switch 260 is closed and it passes the IO_PWR signal to a temperature warning output terminal 270. If the temperature of the resistive braking module 140 exceeds the set point of the thermal limit switch 260, the switch 260 opens and interrupts the IO_PWR signal. The temperature warning output terminal 270 may be connected to a PLC or other circuitry to indicate the temperature warning. Automatic or manual corrective actions may be taken to avoid a further temperature increase. For example, an operator or controller may increase the interval between subsequent contactor coil signal assertions to allow the braking resistors 240, 245, 250 to cool.

If the temperature of the resistive braking module 140 continues to increase beyond a disable set point, the thermal limit switch 265 opens and interrupts the contactor coil signal to the contactor 200. In the illustrated embodiment, the nominal disable set point of the thermal limit switch 265 is about 80 degrees Celsius. If the motor 120 is in a deactivated state when the thermal limit switch 265 opens, the contactor 200 is prevented from activating. Hence, the motor 120 cannot be energized until after the temperature of the resistive braking module 140 has cooled down below the set point and the thermal limit switch 265 closes. Because the braking resistors 240, 245, 250 are exercised upon a motor shutdown, it is likely that the temperature limit switch 265 will open between cycles of the motor 120 as the temperature increases from braking operation. However, in the event that the motor 120 is currently operating when the thermal limit switch 265 opens, the contactor 200 is deactivated, which opens the load contacts 205, 210, 215 and closes the auxiliary contacts 220, 225, 230 to enable the braking resistors 240, 245, 250 and stop the motor 120. The auxiliary contact 235 also closes and generates the ConStat signal. A mismatch between the Contactor Coil signal and the ConStat signal indicates that the motor 120 has been shut down during operation due to a temperature limit violation in the resistive braking module 140.

The temperature warning and disabling set points described above are exemplary, and may vary depending on the particular implementation. The thermal limit switches 260, 265 may be located in various positions on the resistive braking module 140. For example, they may be located near or in contact with an outer housing of the resistive braking module 140 to monitor the contact temperature of the resistive braking module 140. Alternatively, the thermal limit switches 260, 265 may be located near the braking resistors 240, 245, 250. The set points of the thermal limit switches 260, 265 will depend, in part, on where they are positioned within the resistive braking module 140.

The logic implemented above by the thermal limit switches 260, 265 and/or contacts 205, 210, 215, 220, 225, 230, 235 is exemplary. Equivalent arrangements may be implemented using different arrangements of normally open or normally closed thermal limit switches and/or contacts.

Figure 3:
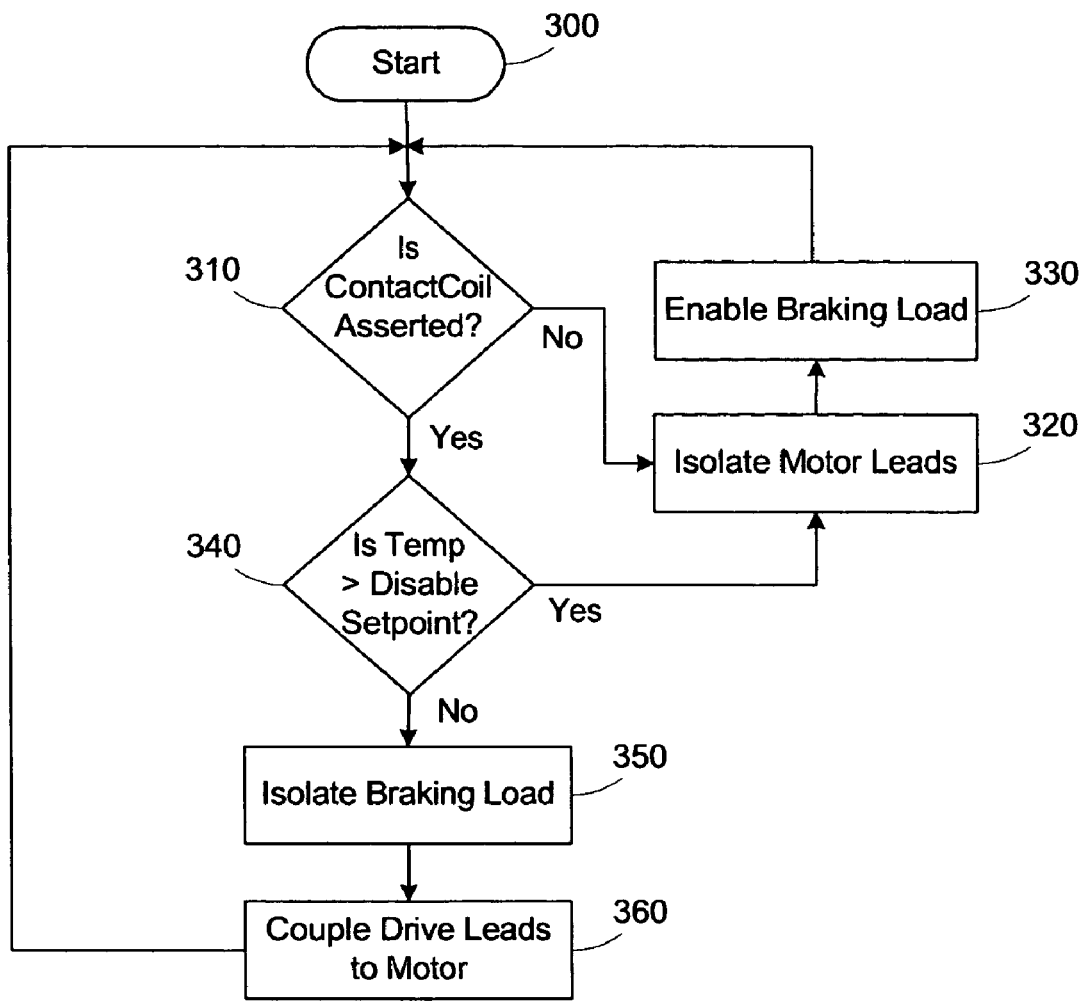
FIG. 3 is a simplified flow diagram of motor enabling logic implemented by the resistive braking module of FIG. 2.

A simplified flow diagram of the logic implemented by the resistive braking module 140 is illustrated in FIG. 3. The method initiates in block 300. In block 310, the resistive braking module 140 monitors the status of the ContactCoil signal. If the ContactCoil signal is deasserted, the drive unit 110 seeks to stop the motor 120 and the motor leads 160 are isolated in block 320, and the braking load (e.g., the braking resistors 240, 245, 250) is enabled in block 330. The motor leads 160 remain isolated and the braking load remains enabled until a subsequent assertion of the ContactCoil signal is identified in block 310.

If the ContactCoil signal is asserted in block 310, the drive unit 110 seeks to operate the motor 120. In block 340, the resistive braking module 140 determines if the temperature is above the disable set point (e.g., 80 degrees C.). If the temperature is below the disable set point, the braking load is isolated in block 350 and the drive leads 150 are coupled to the motor leads 160 in block 360. If the temperature is above the disable set point in block 340, the resistive braking module 140 isolates the motor leads 160 in block 320 and enables the braking load in block 330.

The steps of isolating or enabling the motor leads 160 and/or braking load do not require changes of state, but rather, if the logic state does not change, the state of the connection does not change. For example, if the motor leads 160 are coupled to the drive leads 150 and the temperature remains below the disable set point, the leads 150 remain coupled.

Figure 4:
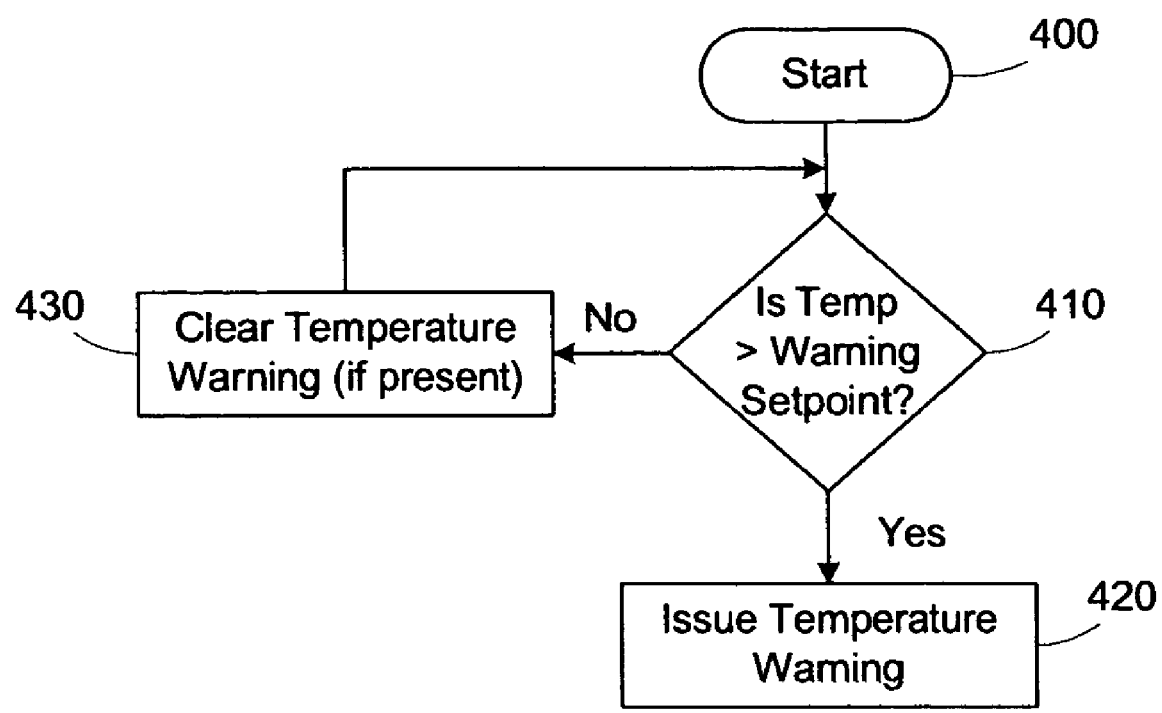
FIG. 4 is a simplified flow diagram of a temperature warning process implemented by the resistive braking module of FIG. 2.

As illustrated in FIG. 4, the resistive braking module 140 implements temperature warning logic starting at block 400 in parallel with the motor enabling logic of FIG. 3. If the temperature is above the warning set point in block 410, the resistive braking module 140 issues a temperature warning in block 420. If the temperature is below the warning set point in block 410, the resistive braking module 140 clears any existing temperature warning in block 430 and continues monitoring the temperature in block 410.

The resistive braking module 140 described herein has numerous advantages. Because it can be connected between the drive unit 110 and the motor 120, it may be used with an installed equipment base. Also, the thermal protection provided by the resistive braking module 140 reduces the likelihood that its temperature will exceed safe touch limits through intentional or unintentional frequent cycling of the braking load.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A braking module, comprising:
   a braking load;
   an input terminal for receiving a motor drive signal;
   an output terminal; and
   control logic adapted to receive a motor enable signal, couple the output terminal to the input terminal responsive to the motor enable signal being asserted, couple the output terminal to the braking load responsive to the motor enable signal being deasserted, and prevent the coupling of the output terminal to the input terminal responsive to a temperature of the braking module exceeding a predetermined disable set point.

2. The braking module of claim 1, wherein the control logic is further adapted to isolate the input terminal from the output terminal and couple the output terminal responsive to the temperature of the braking module exceeding the predetermined disable set point.

3. The braking module of claim 1, wherein the control logic is further adapted to generate a temperature warning signal responsive to a temperature of the braking module exceeding a predetermined warning set point.

4. The braking module of claim 1, wherein the control logic comprises a contactor adapted to receive the motor enable signal, the contactor having a first contact coupled between the input terminal and the output terminal and a second contact coupled between the output terminal and the braking load, the first contact being closed responsive to the motor enable signal being asserted and the second contact being closed responsive to the motor enable signal being deasserted.

5. The braking module of claim 4, wherein the control logic further comprises a first thermal limit switch coupled to the contactor and adapted to receive the motor enable signal and isolate the motor enable signal from the contactor responsive to the temperature of the braking module exceeding the predetermined disable set point.

6. The braking module of claim 5, wherein the control logic further comprises a second thermal limit switch adapted to generate a temperature warning signal responsive to the temperature of the braking module exceeding a predetermined warning set point.

7. The braking module of claim 1, wherein the braking load comprises a ceramic bar resistor.

8. A braking module, comprising:
   a plurality of input terminals adapted to receive a motor drive signal including a plurality of phase components;
   a plurality of output terminals;
   a braking load coupled across the output terminals; and
   control logic adapted to receive a motor enable signal, couple the output terminals to the input terminals responsive to the motor enable signal being asserted, couple the output terminals to the braking load responsive to the motor enable signal being deasserted, and prevent the coupling of the output terminals to the input terminals responsive to a temperature of the braking module exceeding a predetermined disable set point.

9. The braking module of claim 8, wherein the control logic is further adapted to isolate the input terminals from the output terminals, and couple the output terminals to the braking load responsive to the temperature of the braking module exceeding the predetermined disable set point.

10. The braking module of claim 8, wherein the control logic is further adapted to generate a temperature warning signal responsive to a temperature of the braking module exceeding a predetermined warning set point.

11. The braking module of claim 8, wherein the control logic comprises a contactor adapted to receive the motor enable signal, the contactor having a first plurality of contacts coupled between the input terminals and the output terminals and a second plurality of contacts coupled between the output terminals and the braking load, the first plurality of contacts being closed responsive to the motor enable signal being asserted and the second plurality of contacts being closed responsive to the motor enable signal being deasserted.

12. The braking module of claim 11, wherein the control logic further comprises a first thermal limit switch coupled to the contactor and adapted to receive the motor enable signal and isolate the motor enable signal from the contactor responsive to a temperature of the braking module exceeding a predetermined disable set point.

13. The braking module of claim 12, wherein the control logic further comprises a second thermal limit switch adapted to generate a temperature warning signal responsive to the temperature of the braking module exceeding a predetermined warning set point.

14. The braking module of claim 8, wherein the braking load comprises a plurality of ceramic bar resistors coupled across the output terminals.

15. A motor control system, comprising:
a motor;
a motor drive unit adapted to generate a motor enable signal and a motor drive signal; and
a braking module coupled between the motor drive unit and the motor, comprising,
a braking load;
an input terminal coupled to the motor drive unit for receiving the motor drive signal;
an output terminal coupled to the motor; and
control logic adapted to receive the motor enable signal, couple the output terminal to the input terminal responsive to the motor enable signal being asserted, couple the output terminal to the braking load responsive to the motor enable signal being deasserted, and prevent the coupling of the output terminal to the input terminal responsive to a temperature of the braking module exceeding a predetermined disable set point.

16. The system of claim 15, wherein the control logic is further adapted to isolate the input terminal from the output terminal, and couple the output terminal to the braking load responsive to a temperature of the braking module exceeding the predetermined disable set point.

17. The system of claim 15, wherein the control logic is further adapted to generate a temperature warning signal responsive to a temperature of the braking module exceeding a predetermined warning set point.

18. The system of claim 15, wherein the control logic comprises a contactor adapted to receive the motor enable signal, the contactor having a first contact coupled between the input terminal and the output terminal and a second contact coupled between the output terminal and the braking load, the first contact being enabled responsive to the motor enable signal being asserted and the second contact being enabled responsive to the motor enable signal being deasserted.

19. The system of claim 18, wherein the control logic further comprises a first thermal limit switch coupled to the contactor and adapted to receive the motor enable signal and isolate the motor enable signal from the contactor responsive to a temperature of the braking module exceeding a predetermined disable set point.

20. The system of claim 19, wherein the control logic further comprises a second thermal limit switch adapted to generate a temperature warning signal responsive to the temperature of the braking module exceeding a predetermined warning set point.

21. The system of claim 15, wherein the braking load comprises a ceramic bar resistor.

22. A method for controlling a motor, comprising:
coupling a drive lead carrying a motor drive signal to a motor lead of the motor responsive to a motor enable signal being asserted;
coupling the motor lead to a braking load responsive to the motor enable signal being deasserted; and
preventing the coupling of the drive lead to the motor lead responsive to a temperature of the braking load exceeding a predetermined disable set point.

23. The method of claim 22, further comprising determining a temperature of the braking load.

24. The method of claim 23, wherein determining the temperature of the braking load further comprises determining the temperature of a module housing the braking load.

25. The method of claim 22, further comprising isolating the input terminal from the output terminal and coupling the output terminal responsive to the temperature of the braking module exceeding the predetermined disable set point.

26. The method of claim 22, further comprising generating a temperature warning signal responsive to a temperature of the braking module exceeding a predetermined warning set point.

27. The method of claim 22, further comprising:
closing a first contact coupled between the drive lead and the motor lead responsive to the motor enable signal being asserted; and
closing a second contact coupled between the motor lead and the braking load responsive to the motor enable signal being deasserted.

28. The method of claim 27, further comprising isolating the motor enable signal from a contactor including the first and second contacts responsive to the temperature of the braking module exceeding the predetermined disable set point.

29. The method of claim 22, wherein coupling the motor lead to the braking load further comprises coupling the motor lead to a ceramic bar resistor.

30. A system for controlling a motor, comprising:
means for coupling a drive lead carrying a motor drive signal to a motor lead of the motor responsive to a motor enable signal being asserted;
means for coupling the motor lead to a braking load responsive to the motor enable signal being deasserted; and
means for preventing the coupling of the drive lead to the motor lead responsive to a temperature of the braking load exceeding a predetermined disable set point.

* * * * *